Figure 1:
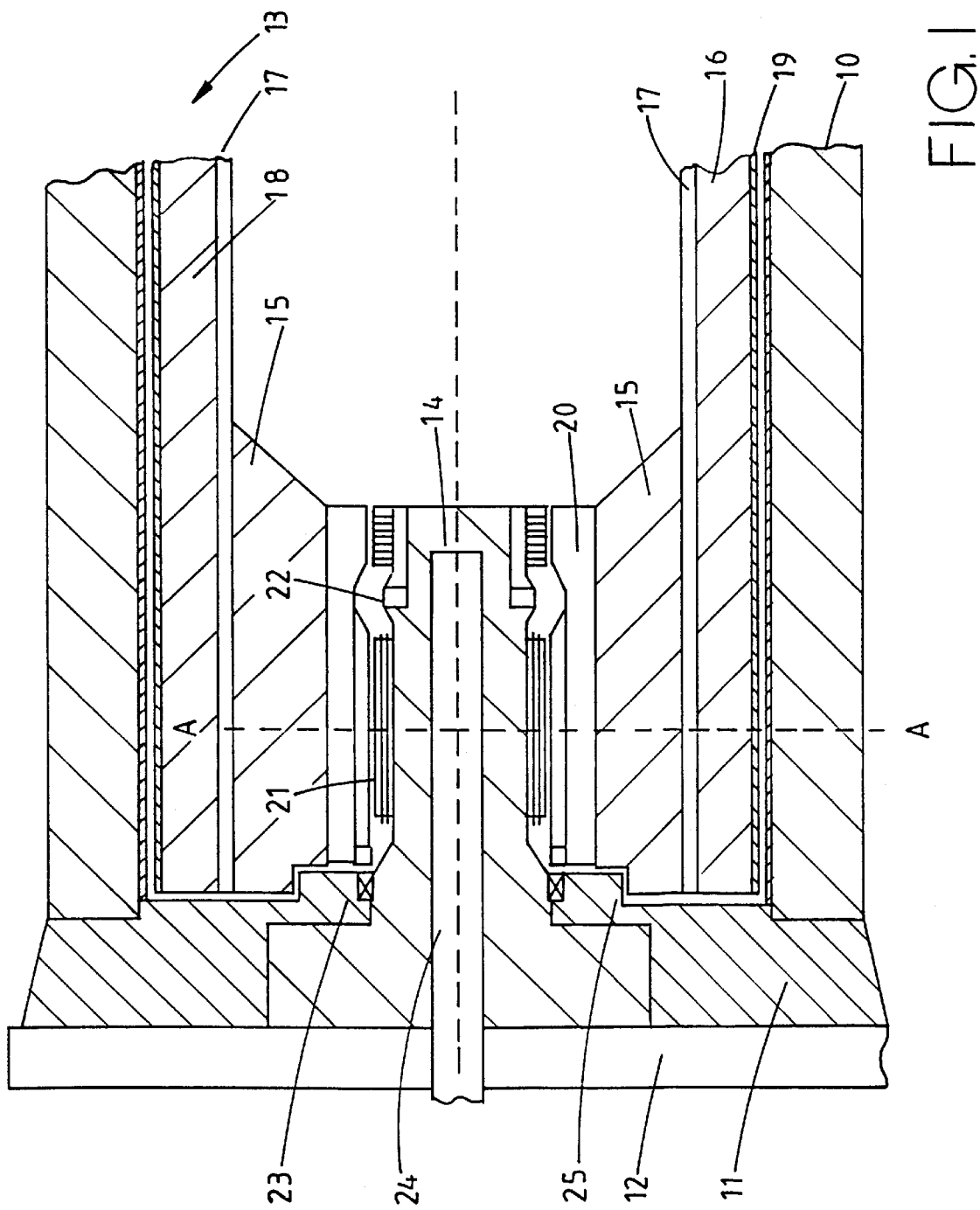

United States Patent
Ellis et al.

[11] Patent Number: 5,931,249
[45] Date of Patent: Aug. 3, 1999

[54] KINETIC ENERGY STORAGE SYSTEM

[76] Inventors: Christopher William Henderson Ellis, 56 Strathen Road, Leamington Spa, CV32 5NW, United Kingdom; Jay Herbert Stoffer, 6180 Carterbury Dr., Culver City, Calif. 90230

[21] Appl. No.: 08/602,764

[22] PCT Filed: Sep. 7, 1994

[86] PCT No.: PCT/GB94/01946

§ 371 Date: Mar. 7, 1996

§ 102(e) Date: Mar. 7, 1996

[87] PCT Pub. No.: WO95/07193

PCT Pub. Date: Mar. 16, 1995

[30] Foreign Application Priority Data

Sep. 8, 1993 [GB] United Kingdom .................... 9318591

[51] Int. Cl.⁶ ...................................................... B60K 1/00
[52] U.S. Cl. ........................... 180/165; 180/65.3; 180/312
[58] Field of Search ................................... 180/165, 65.1, 180/65.2, 65.3, 55, 53, 311, 312

[56] References Cited

U.S. PATENT DOCUMENTS

| | | | |
|---|---|---|---|
| 3,493,066 | 2/1970 | Dooley | 180/165 |
| 3,665,788 | 5/1972 | Naman | 180/165 |
| 3,771,311 | 11/1973 | Herbst | 180/165 |
| 3,858,674 | 1/1975 | Tabor | 180/165 |
| 3,870,116 | 3/1975 | Seliber | 180/65.1 |
| 3,923,115 | 12/1975 | Helling | 180/165 |
| 4,032,807 | 6/1977 | Richter . | |
| 4,088,041 | 5/1978 | Kraus . | |
| 4,252,208 | 2/1981 | Heidemeyer et al. | 180/165 |
| 4,254,843 | 3/1981 | Han et al. | 180/165 |
| 4,309,620 | 1/1982 | Bock . | |
| 5,236,061 | 8/1993 | Haupt | 180/55 |

FOREIGN PATENT DOCUMENTS

| | | |
|---|---|---|
| 91100087 | 2/1991 | European Pat. Off. . |
| 504990 | 4/1920 | France . |
| 1068522 | 1/1940 | France . |
| 2336568 | 12/1976 | France . |
| 2230795 | 6/1972 | Germany . |
| 7606441 | 6/1976 | Netherlands . |
| 9002415 | 11/1990 | Netherlands . |
| 2264153 | 3/1993 | United Kingdom . |

*Primary Examiner*—Richard M. Camby
*Attorney, Agent, or Firm*—Oppenheimer Wolff & Donnelly LLP

[57] ABSTRACT

A kinetic energy storage system utilizes a flywheel with a motor generator to store energy. A flywheel rotor is located in an elongate housing which forms at least part of a rigid framework. In use on a vehicle, the framework provides a chassis for the vehicle and the vehicle may be powered from the flywheel. The flywheel rotates at high speed in a vacuum and the motor generator could be an inverted switched reluctance motor generator optionally providing a magnetic bearing function.

20 Claims, 7 Drawing Sheets

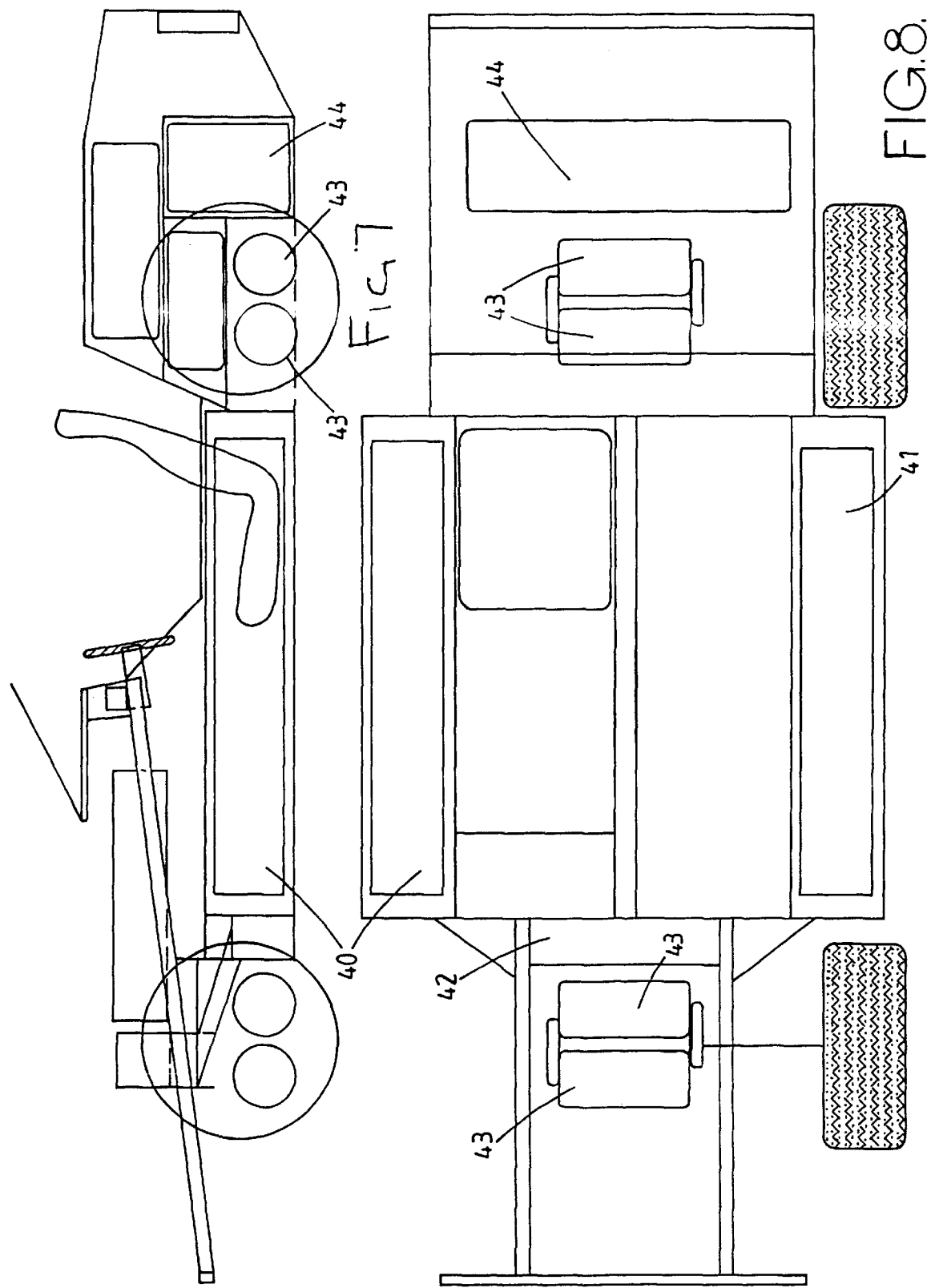

KINETIC ENERGY STORAGE SYSTEM

This invention relates to kinetic energy storage systems and, in particular but not exclusively, to flywheel systems for storage of motive power in vehicles, for example to substitute for battery energy storage.

It has been proposed to provide energy storage devices in vehicles in the form of flywheels, the flywheels being charged up by various prime movers and providing an energy source to power, for example, an electric generator. The capacity of such energy storage systems has hitherto been limited by various factors including the additional weight imposed on the vehicle, the need for high rates of rotation, safety requirements, the availability of suitable materials, decay in stored energy over time, and the availability of suitable systems for driving the flywheel and for releasing energy from the flywheel rotor.

An object of the invention is to provide an improved kinetic energy storage system in which at least some of the above limitations are reduced.

According to the invention a kinetic energy storage system comprises housing means defining a cylindrical space, one or more flywheel rotors located within the housing means; a rigid framework of which the housing means comprises at least a part, the framework being incorporated into a structure, such as a vehicle, as a main supporting element of the structure; drive and driven means for driving the or each flywheel rotor and for extracting energy from the flywheel rotors; and control means for controlling the system. When two rotors are employed one of the rotors is arranged to rotate in the opposite direction to the other.

Preferably the housing means is in the form of one or two elongate cylinders with multiple flywheel rotors located end to end in a cylinder, or with the flywheel rotors located one to each cylinder respectively. In the case when two cylinders are used the cylinders may be located with their axes spaced from and parallel to one another and the cylinders may be rigidly interconnected in said rigid framework. Such framework may constitute chassis means of a vehicle.

Each of the flywheel rotors may be associated with motor generator means whereby the rotors are driven and whereby energy is extracted from the rotors. The motor generator means may be located interiorly of the housing means, a stator being located at the axis of each rotor and being operatively associated with a motor generator rotor carried internally of the flywheel rotor as part of the flywheel rotor. The internal space within the housing of the flywheel rotor may be sealed to enable a vacuum to be created within said space. In one embodiment the motor generator is an inverted switched reluctance motor generator and the bearings for the flywheel rotor are magnetic bearings which may be active and/or passive magnetic bearings. The motor generator function may be separate from or integrated with one or both active magnetic bearings.

The flywheel rotor is preferably formed with at least its outer part incorporating a high strength material which may be an anisotropic material such as graphite or Kevlar fibre. The outer part of the flywheel rotor is normally in close proximity to the cylindrical internal wall of the housing means and the wall may be coated with low friction material so that in the unlikely event that the rotor under, for example, bearing failure conditions comes into contact with the housing wall, friction is reduced.

Cooling means may be conveniently provided in the stator from which the flywheel rotor is supported for rotation so that cooling of the motor generator takes place during normal use. This also provides a cooling facility if the flywheel rotor should rapidly decelerate.

The energy storage system may find application in a static location as a source of energy, for example to charge similar mobile systems, as an independent source of energy charged from, say, off peak electricity supplies, for uninterruptable power supply systems, or for load equalising systems in an electricity distribution system. However the primary application of the system is seen to be in vehicles in which the system is charged up at the beginning of the journey and powers the running of the vehicle until recharging is required at a recharging station. The vehicle may have an auxiliary power unit, for example an internal combustion engine or gas turbine and associated generator or fuel cell, which is capable of recharging the system.

Typically each flywheel rotor is 1–5 meters in length having an external diameter of 10–60 cms, and is rotatable at between 10,000 and 300,000 rpm, or more. The ratio of diameter to length of the flywheel rotor may be in the range 1:3 to 1:20.

In the application of the system to road vehicles one or more housing means may form the main rigid structural unit of the vehicle in the manner of a vehicle chassis, with the rotors arranged in contra rotating pairs and their axes extending longitudinally or transverse to the direction of travel of the vehicle. More than one pair of rotors may be employed and one or more pairs may extend transverse and one or more pairs may extend longitudinally of the direction of travel.

Figure 2:
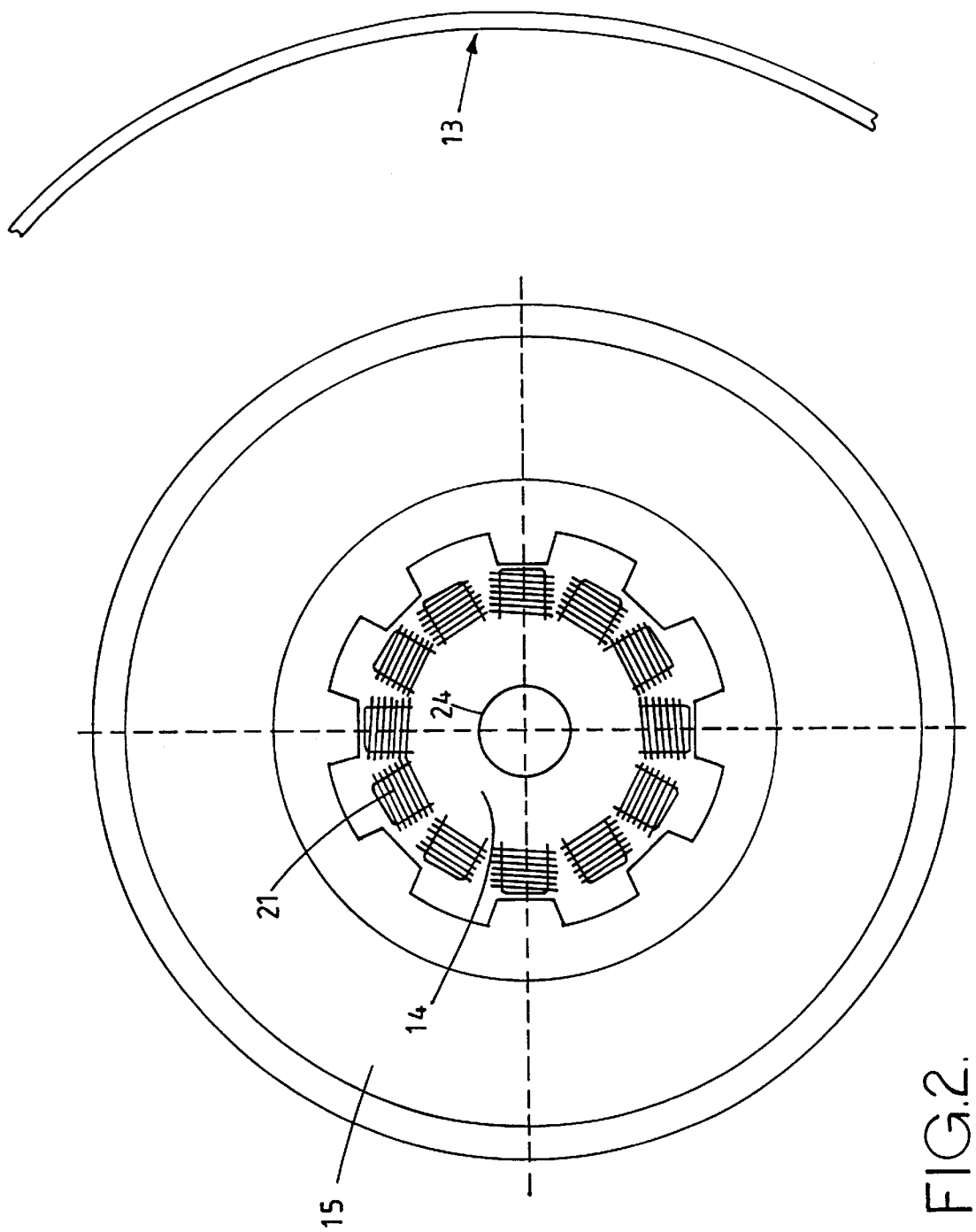
Figure 3:
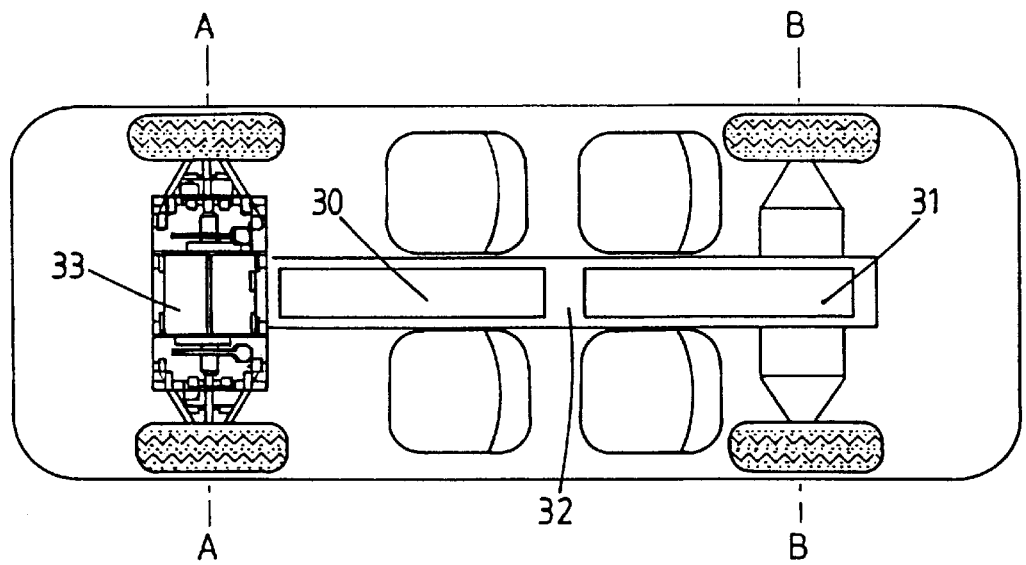
Figures 4A, 4B:
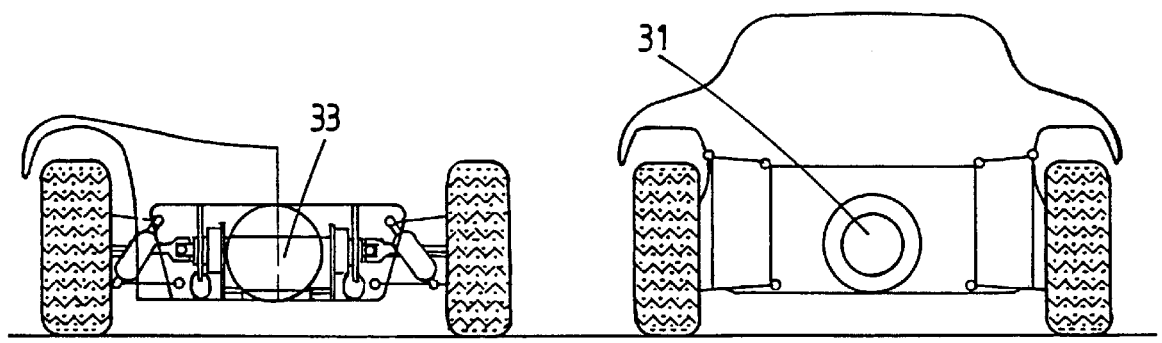
Figure 5:
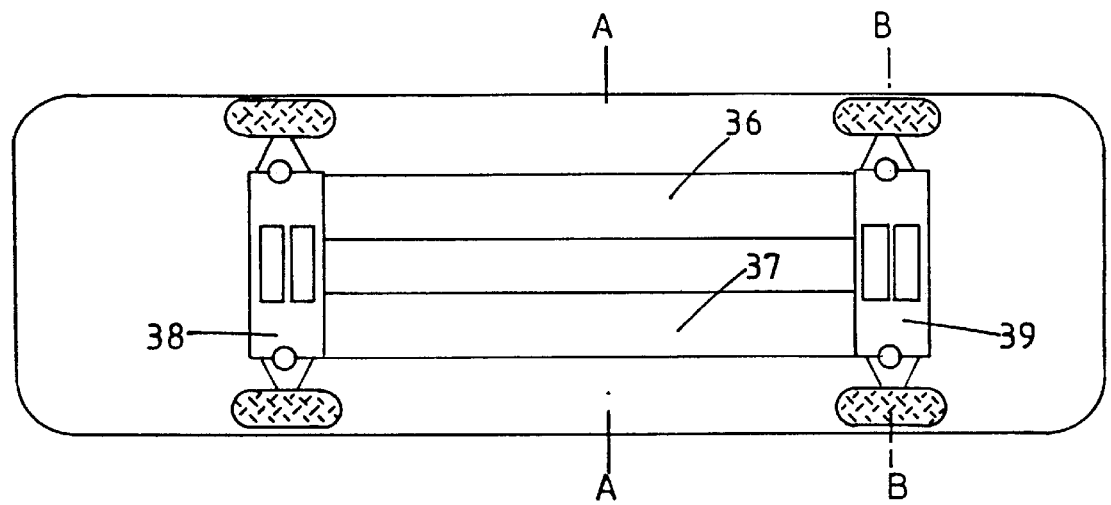
Figure 6:
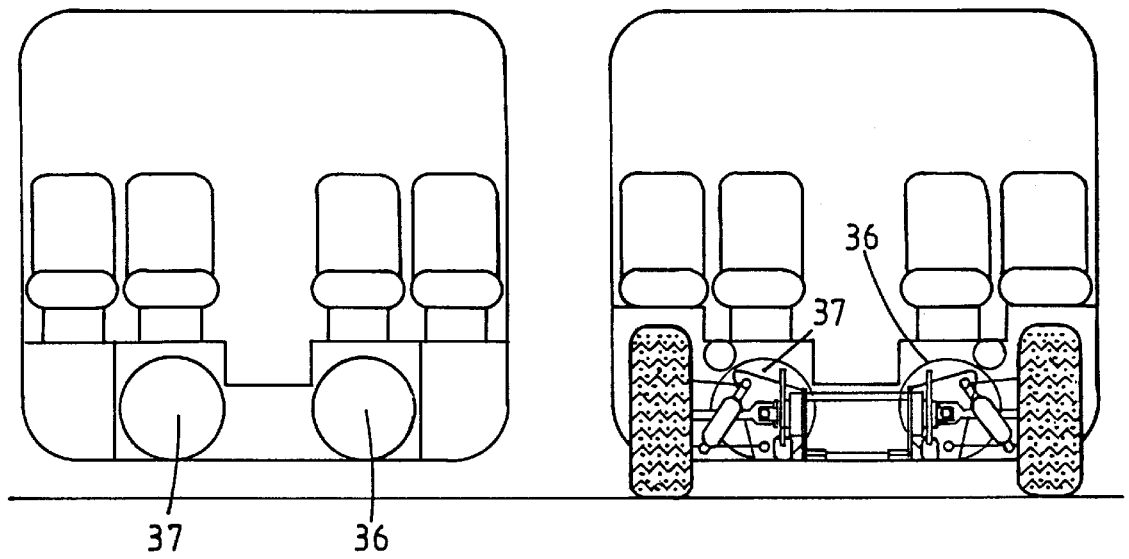
Figure 9:
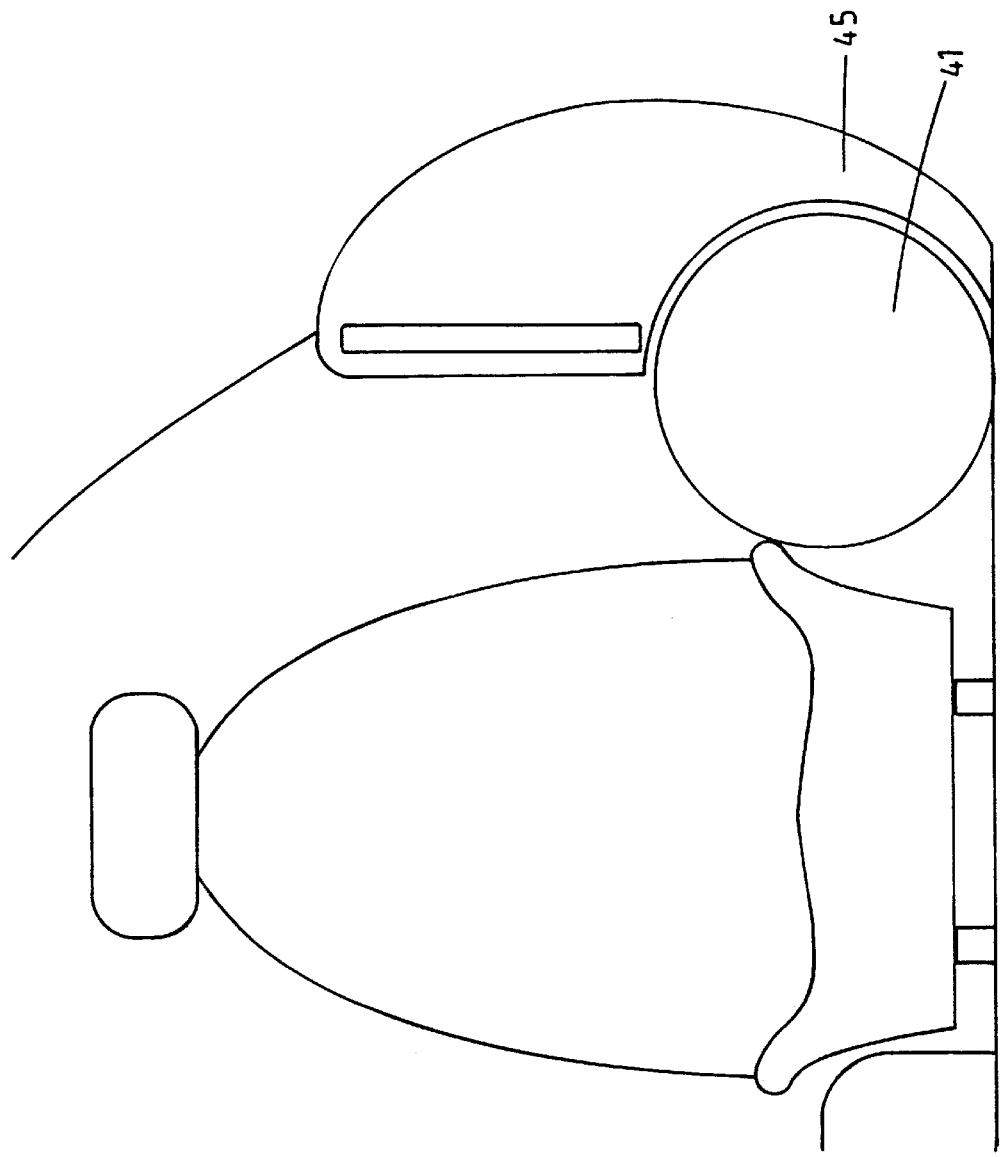
Figure 10:
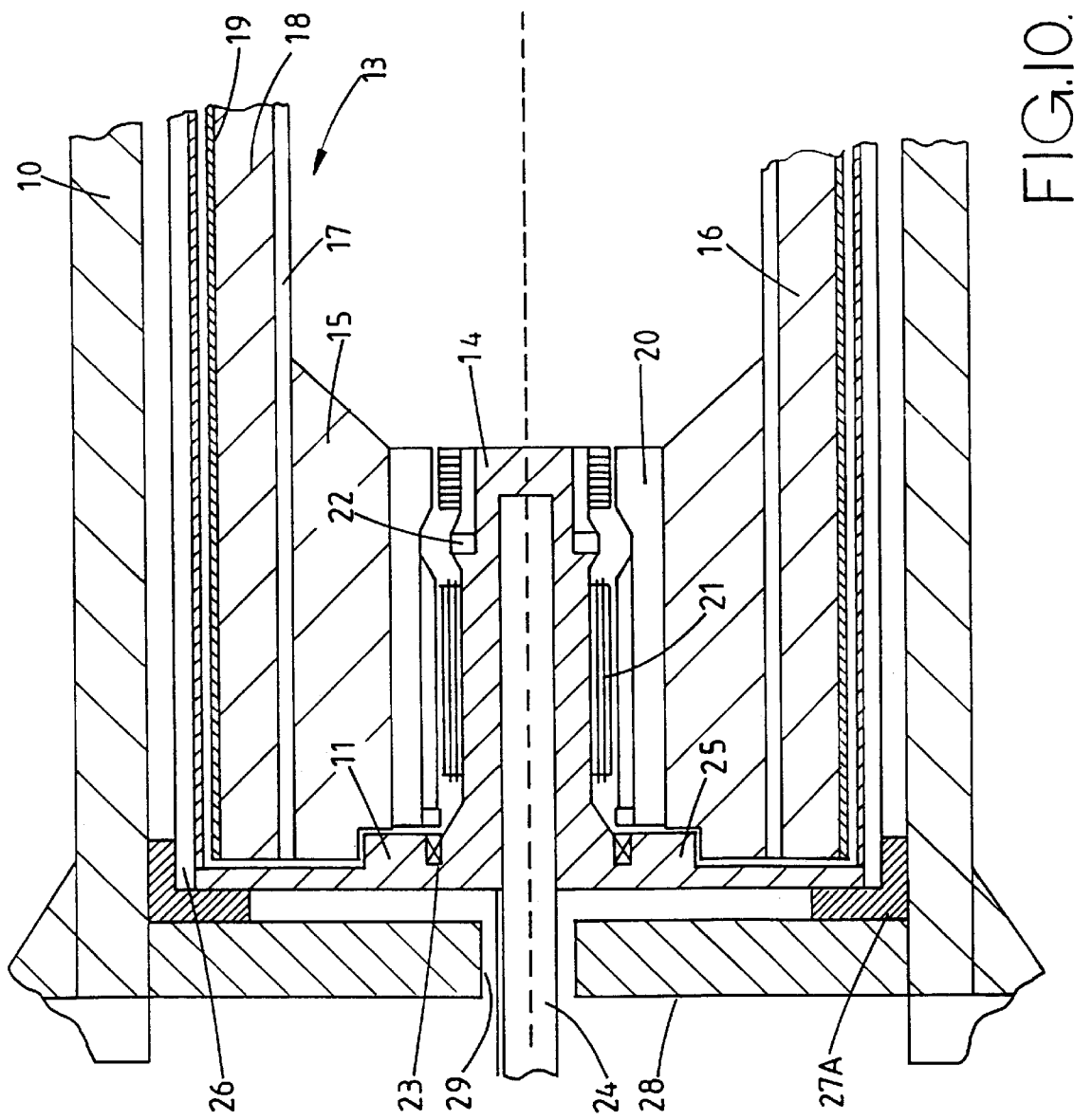

Further features of the invention will appear from the following description of embodiments of the invention given by way of example only and with reference to the drawings, in which:

FIG. 1 is a longitudinal cross-section through one end of a flywheel rotor and its housing, FIG. 2 is a cross-section on the line A—A in FIG. 1, FIG. 3 is a plan view of a road vehicle fitted with a flywheel system according to the invention, FIGS. 4A and 4B are vertical sections of the vehicle of FIG. 3, on the lines A—A and B—B, FIG. 5 is a plan view of a bus fitted with a flywheel system according to the invention, FIG. 6 is a cross-section on the line A—A in FIG. 5, FIG. 6A is a cross-section on the line B—B in FIG. 5, FIG. 7 is a side view of a car fitted with a flywheel system according to the invention, FIG. 8 is a plan view of the vehicle of FIG. 7, FIG. 9 is a vertical cross-section of the vehicle of FIGS. 7 and 8, and FIG. 10 is a longitudinal cross section of an alternative form of flywheel rotor and housing assembly.

Referring to the drawings and firstly to FIGS. 1 and 2, a flywheel rotor assembly is shown which includes a hollow cylindrical housing 10 having end caps 11 at opposite ends, each connected to a part 12 of a vehicle framework. The housing 10 defines a cylindrical space in which is located, with a small clearance, a rotor 13 rotatable about stator members 14 which are secured each to one of the end caps 11.

A rotor 13 is of generally annular shape having, towards each end, radially inwardly directed portions 15 which rotatably mount the rotor 13 relative to the stator member 14.

The cylindrical housing 10 is of strong, substantial construction to contain the rotor 13 should it fail whilst rotating at high speed within the housing and also to provide strength and impact resistance when the assembly is for use in a vehicle. The housing 10 also serves as a vacuum vessel to minimise energy losses due to windage.

In vehicle applications of the assembly full advantage is taken of the elongate form and of the extra strength built into the housing for containment and safety reasons to provide the main or subsidiary structural member or members of the vehicle. The extra strength of the housing achieves a high safety factor for containment and yields enhanced torsional and beam stiffness in the main structure of a vehicle. The weight and material cost of the emergency containment strength, which may never be needed, is now fully exploited in its incorporation into the main structure of the vehicle, and by this arrangement the net overall weight and cost of the vehicle may be reduced.

The principle advantage of the invention over other flywheel systems is that, because each containment vessel also serves as a major part of the main structure of a vehicle, the energy storage per unit mass and the power per unit mass are effectively much higher than for a conventional flywheel built of similar material which is not incorporated as an integral part of the vehicle structure.

The annular body 16 of the rotor is constructed to have high hoop strength, i.e. tensile strength in the circumferential direction of the rotor to enable high speed rotation, and also sufficient beam strength and stiffness to enable the rotor to be supported only at the ends without inducing flexing due to its high speed rotation. The body 16 of the rotor is of layered construction having an inner layer 17 which may be of high tensile strength material to provide beam strength, and an intermediate layer 18 which may include high tensile strength fibres such as graphite or Kevlar or other appropriate hoop strength material. An outer sheath 19 of very high hoop strength material may also be provided. The construction of the body 16 of the rotor is of considerable importance in achieving safety based on strength under high rotational speeds, combined with achieving a high level of energy storage which is usually judged against the parameters of specific energy and specific power. Maximum specific energy is proportional to the hoop tensile strength of the rotor body and inversely proportional to the density of the materials of the body.

The inwardly directed portions 15 carry at their radially inner end an inner sleeve 20 of ferro magnetic material. This sleeve 20 acts as the motor generator rotor and coacts with the stator 14 having windings 21 wound about ferro magnetic material of the stator 14. The stator 14 also carries about its periphery one or more permanent magnets 22 which act as part of a magnetic bearing between the stator 14 and the rotor. The stator 14 and the sleeve 20 together constitute a motor generator arrangement in the form of an inverted switched reluctance motor generator. The magnetic bearing arrangement used in this particular example ensures smooth running of the rotor about the stator 14 at high speeds and is combined with an active magnetic thrust bearing 23 mounted on the end cap 11 to ensure that the rotor is centred during operation. In this arrangement the electro magnetic bearing functions are integrated with those of the electric motor generator. If desired a combined motor generator and active bearing arrangement can be located at each end of the rotor.

In case a magnetic bearing should fail or temporarily be overcome by extreme shock loads, a flange or other mechanical bearing arrangement 25 is provided as backup. This also serves to prevent the outer surface of the rotor from contacting the inner surface of the containment vessel. Note that sensors for the active magnetic bearing functions are provided but are not shown, for clarity.

The space within the housing 10 and between the end caps 11 in which the rotor is located is sealed from the external atmosphere and is under vacuum in order to reduce windage losses during operation.

To effect cooling of the motor generator and of the flange or other mechanical bearing and magnetic bearings a duct 24 for coolant is formed centrally of the stator 14 and the coolant is circulated through the stator and through an external heat exchanger (not shown).

The rotor assembly is generally of elongate construction having a diameter to length ratio of between 1:3 and 1:20. For example the rotor may be between 1–5 meters long and have an external diameter of 10–60 cms. The rotor may have a length of several meters in a large road vehicle, boat or static application. The rotor is intended to be operated at speeds of from 10,000 rpm to several hundred thousand rpm in order to provide high levels of energy storage in the form of kinetic energy.

The flywheel rotor assembly described may have various applications. A single assembly may be used in a static location, for example above ground or installed vertically in the ground with the ground providing a containment function. In this arrangement the flywheel assembly may serve as a load levelling device in electricity distribution networks or as a backup power supply for computer systems. Alternatively the flywheel assembly may be used as a recharging station to supply vehicles equipped with flywheel energy storage systems or other systems.

Known flywheel systems are capable of producing high levels of peak specific power, usually expressed in watts per kilogram, but only for short periods of time, because the flywheel and motor rotor rapidly heat up. The assembly of the invention is capable of very high peak power, particularly where there are two motor generators per rotor. It is also able to deliver or absorb high levels of sustained power, at rates well in excess of one kilowatt per kilogram of rotor mass, for many minutes. This is of particular value in recharging, enabling an assembly to be recharged in five minutes or less. The use of switched reluctance techniques means that relatively low levels of heat are generated in each motor rotor. The majority of heat is produced in the stators, which are liquid cooled. The heat generated in the motor rotors stators can be conducted rapidly into the main mass of the flywheel rotor which acts as a heat sink. The rotor outer surface is conveniently a black body, especially when formed of graphite fibre, as is the inner surface of the containment/vacuum vessel. This has the effect of allowing heat built up in the rotor to radiate out into the walls of the containment vessel and then be conducted away into the vehicle structure where ambient air convection will complete the heat dissipation process. The assembly may provide a larger surface area of rotor rim compared to a conventional flywheel of similar mass, enabling the levels of power to be sustained for longer periods of time.

When used as an energy storage system in vehicles the flywheel assembly of rotor, motor generator, bearings and housing means, usually needs to be installed with a further flywheel assembly in which the rotors of the assemblies rotate in opposite directions. This balances the gyroscopic effect of the flywheels when the assemblies are located coaxially or with parallel axes.

The assembly of FIG. 1 may be used in a vehicle in which the housing means 10 usually comprises at least a part of the main supporting element of the vehicle structure. Preferably the cylindrical housing means is in the form of one or more elongate cylinders with a pair of rotors located end to end in a common cylinder, or with the rotors located one to each cylinder respectively. The cylinders may be located with their axes spaced from and parallel to one another and the cylinders may be interconnected in a rigid framework. Such framework may constitute chassis means of a vehicle.

As an alternative to using a pair of kinetic rotor assemblies rotating about parallel axes in opposite directions the rotor assemblies may be arranged to be coaxial and arranged in end to end relationship, the rotors rotating in opposite directions to balance the gyroscopic effect. In a vehicle such an end to end arrangement may provide a central longitudinal back bone to the vehicle.

Each flywheel assembly may, in a small vehicle, have typically an energy capacity of some 20 Kwh which is doubled when two flywheel assemblies are used but this capacity may be increased to say 250 Kwh for use in large vehicles with rotors of, say, 60 cm in diameter and 5 m in length, the capacity, of course, depending on the operational speeds and the precise size and mass of each rotor. High rates of charging of the flywheel system may be obtained so that charging is brief compared with the operational period of the assembly.

Induction charging systems or directly coupled systems may be employed capable of operating at from 20 to over 200 Kw with the rate of charging being limited only by the capabilities of the motor generators and associated control means, especially when charging from another flywheel assembly.

Referring now to FIGS. 3 and 4 there is shown a road vehicle in many respects of conventional form but in which the flywheel energy storage system is employed. In this case a pair of flywheel assemblies 30 and 31 are provided each of which lie parallel to the direction of travel of the vehicle and the axes of rotation are coincident with one another. Within a containment housing 32 the rotors rotate in opposite directions.

The housing 32 forms a rigid back bone member for the vehicle and the back bone member 32 forms a rigid unit in the nature of a chassis which provides the basic framework for the vehicle. The back bone member 32 extends centrally and longitudinally of the vehicle. The strong construction of the back bone 32 adds to the structural strength of the vehicle obviating the requirement for some of the conventional structural members. Vehicle suspension units may be directly attached to the housing 32. The vehicle may include one or more electric motors 33 to provide tractive power and regenerative braking to recharge the rotors.

Referring now to FIGS. 5 and 6 there is shown another arrangement for employing a flywheel energy storage system in a large vehicle, in this case a large passenger vehicle or bus. Two flywheel assemblies 36 and 37 are arranged to extend longitudinally of the vehicle, parallel to one another, and connected to one another at opposite ends by cross members 38 and 39. The flywheel assemblies 36 and 37 and the cross members 38 and 39 provide a rigid frame which replaces the conventional chassis of the vehicle and provides means for supporting the vehicle suspension system and the body work.

A vehicle, such as a passenger vehicle of relatively large size, may have flywheel rotors of 60 cms diameter so that when fully charged there may be available energy of some 250 Kwh which would give a range for the vehicle between charging of some 300 miles when consuming 750 Wh per mile.

Referring now to FIGS. 7, 8 and 9 there is shown a car incorporating a flywheel energy storage system. In this case a pair of flywheel rotor assemblies 40 and 41 are located one to each side of the vehicle with their axes parallel to one another, one of the rotors rotating in the opposite direction to the other. The assemblies 40 and 41 are rigidly connected together by a framework 42 to provide a rigid construction on which the vehicle suspension is mounted.

The vehicle of FIGS. 7, 8 and 9 is provided with traction motors 43, one being associated with each of the wheels of the vehicle. The motors 43 are supplied with electric power by the motor generators of each of the flywheel assemblies 40 and 41. In this case the car is provided with an auxiliary power unit 44 which can be provided to supply power to the traction motors 43 and/or to the flywheel assemblies 40, 41.

As can be seen in FIG. 9 the car can be provided with a side impact absorbing unit 45 which lies adjacent each of the flywheel assemblies 40, 41 to absorb any side impacts on the vehicle and protect the flywheel assemblies against damage.

Referring now to FIG. 10 there is shown an alternative arrangement to that of FIG. 1 in which a separate vacuum vessel is formed and located within a container housing. In FIG. 10 the same reference numbers are used for similar parts of the FIG. 1 embodiment.

In FIG. 10 the rotor 13 is sealingly enclosed within a cylinder 26, acting as a vacuum vessel, which at its ends is secured to end caps 11 carrying the stators 14. Enclosing the cylinder 26 and end caps 11 is a containment cylinder 10 of rigid construction as for the housing 10 of FIG. 1, and the ends of the cylinder 10 are closed by end caps 28 with a central opening 29 for admission of a coolant duct and cabling. The end caps 28 may be removable to gain access to and to remove the vacuum vessel 26 for insertion of a charged replacement or for maintenance purposes. The vacuum vessel 26 is located within the containment housing 10 by flexible mounting members 27A which provides additional insulation against vibration.

In each of the vehicles described the flywheel assemblies provide electrical power for electric motors by which the vehicle wheels are driven, the motor generators associated with each flywheel assembly acting in a generator mode to feed the traction motors. When the flywheel assembly requires recharging the motor generators act as motors to increase the speed of the associated flywheel rotor.

Safety of the flywheel assemblies is ensured by keeping the elements of the rotor capable of fragmentation to a minimum. Any such elements, usually metal, are contained within an outer wall of the rotor so that any metal fragments are unable to gain sufficient kinetic energy to penetrate the rotor wall and cannot reach the wall of the housing 10 which acts as a containment vessel. The rotor is formed as a relatively long tube within the long tube of the housing and its axis cannot change significantly from the axis of the housing thereby avoiding severe braking of the rotor if, for example, failure of the bearings should occur. In a normal flywheel arrangement such a failure could result in the rotor slewing in the housing and jamming against the walls thereof.

The inner wall of the housing is lined with low friction material compatible with the surface of the outer sheath of the flywheel rotor. The outer sheath may be under stressed to reduce any possibility of the outer rim of the rotor bursting. Should a bearing failure occur it should take several minutes for the flywheel rotor to slow down, thereby allowing heat generated to be dissipated.

It is advantageous if the flywheel rotor has a motor generator which is made compatible-with the traction motors. Switched reluctance motor generators can be used for both the traction motors and the flywheel assembly thereby reducing the complexity, cost and weight of the electronic controller, by effectively combining what would normally be separate controllers for traction and for storage into a single unit.

The controller can also be simplified because it has control over both input and output of energy, and its reversal. In addition, further overall cost and weight savings of controllers can result from integrating the active magnetic bearing functions with the motor generator functions of the kinetic energy storage system, by reducing the total number of controllers required in each vehicle.

The assemblies of the invention are inherently long life systems when compared with, for example, traction batteries. They should be robust enough to survive most vehicle accidents and due to the use of magnetic bearings, little wear should occur.

As an alternative to using a pair of flywheel rotor assemblies rotating about parallel axes in opposite directions the rotor assemblies may be arranged to be coaxial and arranged in end to end relationship, the rotors rotating in opposite directions to balance the gyroscopic effect. In a vehicle such an end to end arrangement may provide a central longitudinal back bone to the vehicle.

It has been found that by using two rotor assemblies, according to the invention, each 1.4 meters long by 30 cms external diameter a theoretical maximum energy storage of 46 kWh can be provided using currently available materials. By only permitting say 75% of the theoretical maximum energy storage to reduce the possibility of rotor failure and by not allowing rotor speed to be taken below 50% of the operational maximum to avoid stress reversals, the accessible energy storage reduces to 26 kWh. This accessible energy storage may be further reduced depending on the materials used, but taking all these factors into account it is envisaged that the storage capacity of the rotor assemblies will be greatly in excess of other electrical storage systems such as lead acid batteries. This particularly applies when considering energy storage capacity in relation to weight, or specific energy.

Conventional flywheel systems require the vehicle to be designed around their particular limitations of shape, size and weight. The assembly of the invention allows the designer to tailor the size and shape of each flywheel assembly to fit within the optimum physical envelope of each particular vehicle design. Because the assembly can act as part of the main vehicle structure, its effective specific energy and specific density can be higher than those of an equivalent flywheel, if similar materials are used. The amount of improvement in system-level specific energy will be a function of the displaced weight of the structural alternatives. Similarly, the improvement in energy density will be a function of the volume of the displaced structural alternatives.

I claim:

1. A kinetic energy storage system for a vehicle having a longitudinal axis, a front end, a rear end and a chassis extending along said longitudinal axis thereof, said system comprising a rigid framework forming said chassis of said vehicle, said framework also extending along the same longitudinal axis and including housing means providing a substantial portion of the support strength of said vehicle chassis, said housing defining a cylindrical space, one or more flywheel rotors located for rotation within the housing means, said flywheel rotors substantially extending from the front end to the rear end, said flywheel rotors being of elongated cylindrical shape, drive and driven means for driving the or each flywheel rotor and for extracting energy from the flywheel rotor for driving the vehicle, and control means whereby the storage system is arranged to be controlled.

2. A storage system according to claim 1 wherein said flywheel rotor has its axis along said longitudinal axis.

3. A storage system according to claim 1 comprising a pair of rotors arranged for rotation in opposite directions.

4. A storage system according to claim 1 wherein the housing means is in the form of an elongate cylinder with flywheel rotors located end to end in the cylinder.

5. A storage system according to claim 4 wherein the housing means is in the form of two or more cylinders, each with a flywheel rotor located therein.

6. A storage system according to claim 5 wherein the cylinders are located with their axes parallel to and spaced from one another.

7. A storage system according to claim 1 wherein the axis of the housing means extends transversely with respect to the vehicle.

8. A storage system according to claim 1 comprising vehicle wheels and a vehicle body mounted on said chassis.

9. A storage system according to claim 1 wherein the drive and driven means is in the form of motor generating means of which the motor generator is an inverted switched reluctance motor generator located interiorly of the housing means.

10. A storage system according to claim 1 wherein the or each flywheel rotor is supported in magnetic bearings, optionally including mechanical bearings.

11. A storage system according to claim 1 wherein the space within the housing means in which the flywheel rotor is located is sealed and provides a space in which a vacuum may be created.

12. A storage system according to claim 1 comprising cooling means for the or each flywheel rotor in which the housing acts as a heat sink.

13. A storage system according to claim 1 comprising cooling means for the motor rotor in which the flywheel rotor acts as a heat sink.

14. A storage system according to claim 1 wherein the or each flywheel rotor is of layered construction, inner layers providing beam stiffness for the rotor.

15. A storage system according to claim 1 wherein the or each flywheel rotor is of layered construction, layers extending circumferentially of the rotor to provide circumferential strength to the rotor.

16. A storage system according to claim 1 wherein the or each flywheel rotor has a ratio of diameter to length in the range 1:3 to 1:20.

17. A storage system according to claim 1 wherein the length of the or each flywheel rotor is in the range of 1–5 meters.

18. A storage system according to claim 1 comprising one or more pairs of flywheel rotors, the rotors in each pair having their axes parallel and the rotors in each pair rotating in opposite directions to one another at speeds in the range of 10,000 rpm to 300,000 rpm.

19. A storage system according to claim 1 wherein the outer surface of the or each flywheel rotor and the complimentary inner surface of the housing means are closely adjacent and have low friction qualities.

20. A storage system according to claim 1 arranged to drive electric motors associated with traction wheels of the vehicle.

* * * * *